United States Patent Office

2,870,124
Patented Jan. 20, 1959

2,870,124

PROCESS FOR PRODUCING SYNTHETIC LINEAR CONDENSATION COPOLYESTERS USING AN ALKYLENE CARBONATE

George E. Ham, Decatur, Ala., assignor to The Chemstrand Corporation, Decatur, Ala., a corporation of Delaware No Drawing. Application June 1, 1953
Serial No. 358,985

20 Claims. (Cl. 260—75)

This invention relates to the production of synthetic linear condensation polyesters. More particularly, the invention is concerned with a new and improved process for preparing copolyesters, such as polyalkylene copolyesters of aromatic and/or aliphatic dicarboxylic acids, which are useful in the preparation of various shaped articles, and which are particularly useful in the formation of fibers and filaments having the ability to be cold drawn.

Linear polyesters prepared by the condensation of glycols and dibasic acids are well known to the art and have been extensively investigated. When these polyesters are in a highly polymerized condition, they can be formed into filaments, fibers, and the like, which can be permanently oriented by cold drawing. That is, when the esterification reaction is carried out for a sufficiently prolonged period under conditions such as to remove the water of reaction effectively, linear polyesters may be produced having extremely high molecular weights, which, in the case of polyesters capable of crystallizing at ordinary temperatures, may possess the property of cold drawing. The non-crystalline polyesters of high molecular weight are viscous liquids at ordinary temperatures, whereas the crystallizable polyesters are hard, tough micro-crystalline substances which melt at a definite crystalline melting point to form viscous liquids.

In the preparation of polyesters from glycols and dibasic acids, the reaction takes place in two stages, during the first of which an intermediate product is formed which is an hydroxyalkyl derivative of the dibasic acid and during this stage or step, water is evolved. In the second stage or step, and in many instances these two stages or steps will merge, a simple molecule, such as water or glycol, is evolved and the reaction mass must be maintained at these elevated temperatures for considerable lengths of time. These factors, namely, prolonged heated at elevated temperatures, have led to discoloration of the polyester, which obviously is undesirable when producing fibers and filaments for commercial use. In addition, the prolonged periods of time necessary to effect reaction are not conducive to continuous operation, which is desirable when producing such a product on a commercial scale.

The difficulties encountered in prior art processes for producing linear polyesters are also encountered in prior art processes for producing linear copolyesters. Further, in many instances, it is desirable to produce a copolyester which is elastic in nature and previously known synthetic materials have not proven satisfactory for this purpose.

Accordingly, it is a primary object of the present invention to provide a new and improved process for producing synthetic linear condensation copolyesters which are capable of being formed into shaped articles, such as fibers, filaments, films, molded articles, and the like. It is a further object of the invention to provide a new and improved process for producing synthetic linear condensation copolyesters which have elastic properties and which are capable of being formed into elastic shaped articles. It is a specific object of the invention to provide a new process for producing copolyesters which, when formed into filaments and cold drawn, show permanent orientation along the fiber axis, as revealed by characteristic X-ray patterns. It is still another object of the present invention to provide a new and improved process for producing synthetic linear condensation copolyesters which alleviates discoloration of the copolyester and results in a reduction of time in which reaction takes place and further, a process which is more economical than prior art processes and which is conducive to continuous operation. Other objects and advantages of the present invention will be apparent from the description thereof hereinafter.

It has unexpectedly been found that the disadvantages of prior art methods for producing synthetic linear condensation copolyesters can be overcome and in general, the objects of the present invention can be accomplished, by reacting an alkylene carbonate with two or more dibasic acids which may be either aliphatic or aromatic or a combination of the two. It has further been found, that the objects of the present invention can be accomplished by employing alkylene carbonate in combination with a glycol and the dibasic acids mentioned above. The alkylene carbonates contemplated in the practice of the present invention are ethylene carbonate, propylene carbonate, butylene carbonate, and other alkylene carbonates containing up to eight carbon atoms in the alkylene portion of the molecule.

The copolyesters of the instant invention are prepared in much the same way as are the homopolyesters as described in copending applications of George E. Ham, Serial Numbers 347,161, now abandoned, and 347,162, both filed April 6, 1953. In preparing the copolymers or copolyesters, the dibasic acids and alkylene carbonate, or the mixture of alkylene carbonate and glycol, when the latter is employed, are mixed and heated at 80 to 300° C. for a period sufficient to effect solution. Normally, solution occurs in 0.1 to 8 hours. Expressed another way, the temperature at this stage of the reaction should be above the melting point of the reaction mass. Thereafter, the solution is heated at a temperature in the range of 80 to 300° C. for 1 to 8 hours with nitrogen, or other inert gas which does not contain oxygen, blowing therethrough to produce the copolyester. When alkylene carbonate alone is employed in the reaction, or when only minor amounts of glycol are present, the copolymer is produced in one stage or step. Usually, however, this copolymer is of low molecular weight and not useful for all purposes, such as in the formation of fibers and filaments, although the same will be useful in making coating compositions, and the like.

To produce a copolyester of higher molecular weight, the copolyester of the first stage is further heated at higher temperatures than employed in the first stage. Ethylene glycol is split off and removed by distillation, or any other suitable means. The melting point and viscosity of the reaction mixture gradually increases, as does the molecular weight of the copolyester being produced. The length of time of heating and the temperature control the molecular weight of the resultant product. The end use of the copolyester will determine the molecular weight. For example, in the formation of filaments and fibers capable of being cold drawn, a molecular weight above 10,000 is desirable for satisfactory results.

In many instances it is advantageous to conduct the present reaction in the presence of a catalyst. As suitable catalysts there may be named p-toluenesulfonic acid, camphorsulfonic acid, zinc propionate, alkali metal hydroxides, such as sodium hydroxide, and the like, alkaline earth alkoxides, alcoholates, etc. Particularly useful catalysts are zinc acetate and others described and claimed in copending applications of James B. Ballentine, et al., Serial No. 347,168, filed April 6, 1953, and Edward H. Sundbeck et al., Serial No. 347,148, filed April 6, 1953. The catalysts may be employed in an amount ranging from 0.01 to 5.0 percent, based on the weight of the reactants.

The use of an alkylene carbonate reduces the time of reaction and even minor amounts of the alkylene carbonate in combination with a glycol reduce the time of reaction. In prior methods of preparing copolyesters from dibasic acids and glycols, the reactants are mixed together and heated in the presence or absence of esterification catalysts, as desired. At least one molecular proportion of glycol per molecular proportion of dibasic acids is employed and in general, higher proportions of the glycol relative to the dibasic acid are used. For example, up to five moles of glycol per mole of dibasic acids are employed since, by so doing, the initial esterification is said to take place more quickly. However, even at this upper ratio of 5 moles glycol per mole dibasic acids the time is prohibitive for continuous operation since a minimum of 5 hours is necessary to complete the first or initial esterification reaction. By adding small amounts, for example, 0.5 mole based on the dibasic acids, of an alkylene carbonate, in accordance with the present invention, the time for effecting the initial esterification is cut approximately in half and the esterification time is cut still further as progressively greater amounts of alkylene carbonate are employed and correspondingly smaller amounts of glycol are employed therewith.

In the process of the present invention, any combination of dibasic aliphatic and/or aromatic acids may be employed and in any proportion. However, in order to produce copolyesters having certain desirable properties, the ratio or proportion of acids in the copolyester are restricted. For example, in order to produce a copolyester having elastic and rubbery properties and also "snap," which is the rate of elastic recovery from deformation, there should be from 30 to 60% by weight in the copolymer molecule of the aromatic component derived from an aromatic dibasic acid. Copolyesters containing more or less than this amount of an aromatic component are highly crystalline, fiber- or filament-forming materials.

Those copolyesters formed by the process of the present invention from two aromatic dibasic acids are tough, lustrous, fiber-forming materials and filaments produced therefrom are capable of being cold drawn. When an aliphatic dibasic acid and an aromatic dibasic acid are employed in making the copolyesters in accordance with the instant process, good textile filaments and fibers can be produced therefrom. However, in such copolyesters, at least 70% by weight of the aromatic dibasic acid should be employed and not more than 30% by weight of the aliphatic dibasic acid should be used, said percentages being based on the total weight of the acids.

When aliphatic dibasic acids alone are employed in making the copolyesters, the products are waxy, lower-melting materials which do not make textile filaments suitable for the manufacture of clothing, and the like, because of their low melting point. However, in certain applications, copolyesters formed from aliphatic dibasic acids in accordance with the present process, are very useful. For example, in the manufacture of upholstery for automobiles, sofas, etc., wherein it is not necessary to have a copolyester of a high melting point since such materials are not washed or dry cleaned at elevated temperatures, or at temperatures above the melting point of the copolyesters.

It has been found that in the process of the present invention, the dibasic acids, whether they be aliphatic or aromatic or a combination of both, glycol and alkylene carbonate may be employed in the following molar ratio: 1 to 4 moles of dibasic acids/0.0 to 5.9 moles glycol/0.1 to 6 moles of alkylene carbonate. In any condensation reaction, however, there should be at least 1 mole of alkylene carbonate or a mixture of alkylene carbonate and glycol per mole of dibasic acids and preferably higher. It is to be understood that any desired ratio of acid components may be employed in any one copolyester, except in the particular instances, pointed out hereinbefore, wherein certain properties in the finished copolyester are desirable.

Many combinations of the aliphatic and/or aromatic acids may be employed. Two or more aliphatic and/or two or more aromatic dibasic acids may be used to form the copolyesters in accordance with the present process. In addition, the present process may be employed with ester-forming derivatives of the aliphatic and aromatic dibasic acids in place of the acids, as is generally the case in the manufacture of synthetic linear condensation polyesters.

In the preparation of copolyesters with alkylene carbonate, the carbonate may react at different rates with each dibasic acid present in the reaction mass, so that copolyesters of a wide range of compositions may result. In general, however, progressive interchange occurs on heating at elevated temperatures to give a more uniform copolyester. That is to say, the recurring dibasic acid nuclei in the polymer chain will be more uniformly distributed. By varying the ratio of reactants, temperature and time of heating most any desired polymer chain structure can be obtained with varying properties.

When a glycol is employed in the present invention, those glycols which contain from 2 to 10 methylene groups separating the hydroxyl groups, are preferred. Any aliphatic dibasic acid may be used in the instant invention. For example, such aliphatic dibasic acids as oxalic, adipic, pimelic, suberic, azelaic, sebacic, succinic, malonic, brassylic, thapsic, japanic, glutaric, methylsuccinic, methylmalonic, sym-dimethyl-succinic, and the like, to name but a few.

Any aromatic dibasic acid may be employed in the present invention, and preferably, those aromatic dibasic acids which contain a paraphenylene linkage. For example, terephthalic acid, o-phthalic acid, isophthalic acid, homophthalic acid, 4,4'-diphenyldicarboxylic acid, p,p'-dicarboxydiphenylsulfone, napthalene-1,5-dicarboxylic acid, p-carboxyphenoxyacetic acid, p-carboxyphenoxypropionic acid, p-carboxyphenoxy-butyric acid, p,p'-dicarboxydiphenyl ether, diphenic acid, p,p'-(ethylenedioxy) dibenzoic acid, etc. are representative of the useful aromatic dibasic acids.

Copolyesters having various melting points may be produced in accordance with the process of the instant invention. For example, melting points in the range of 40° to 350° C. can be obtained. For fiber- and filament-forming copolyesters, the melting point should be in the range of 150° to 300° C. and the copolyester must be capable of crystallizing. In the case of good filament-forming copolyesters, there should not be any bulky side groups present which will destroy the linear symmetry of the polymer chains. It is to be noted that in the case of copolyesters suitable for coating, molding, and like compositions, the presence or absence of bulky side groups is of no particular moment. Further, good fiber- and filament-forming properties are obtained when the copolyester has an intrinsic viscosity of at least 0.3. Intrinsic viscosity, as used herein, is defined as:

$$\text{Limit } \frac{\ln \eta_r}{C} \text{ as } C \text{ approaches } 0$$

in which $\eta_r$ is the viscosity of a dilute solution of the copolyester in a 60:40 mixture of phenol and tetrachloroethane divided by the viscosity of the solvent in the same the cold-drawing may follow the formation of the filaments directly as one part of a continuous process. In this regard, it should also be pointed out that the instant process lends itself to continuous operation due to the great decrease in time to effect condensation or production of the copolyesters over processes employed heretofore.

In the cold-drawing operation any suitable apparatus and process may be used. For example, the filaments may be wound from one roller to another with the second roller rotating at a higher speed than the first roller. For example, the second roller may be rotated at a speed up to about four or five times that of the first roller. If desired, cold-drawing may be effected by employing a snubbing pin.

The term "cold-drawing," as used herein, includes, in addition to drawing filaments at temperatures as low as 0° C., warming the filaments to facilitate stretching, for example, by passing the filaments through warm or hot water or steam before and/or during the cold-drawing operation, or drawing the filaments at any temperature below the melting point thereof.

Numerous advantages of the present invention, not specifically pointed out hereinbefore, will be apparent to those skilled in the art from reading the description of the invention.

It is to be understood that changes and variations may be made without departing from the spirit and scope of the invention as defined in the appended claims.

I claim:

1. A process for making synthetic linear condensation copolyesters comprising forming a mixture comprising (A) at least two dicarboxylic acids selected from the group consisting of saturated aliphatic dicarboxylic acids and aromatic dicarboxylic acids which when having side chains thereon, all of said side chains are saturated, (B) a glycol, and (C) a monomeric alkylene carbonate containing from 2 to 8 carbon atoms in the alkylene group, said components being present in the mixture in a molar ratio of 1 to 4 moles of (A):up to 5.9 moles of (B):0.1 to 6 moles of (C), heating and reacting said mixture at a temperature in the range of 80° to 300° C. until solution of the mixture occurs, and thereafter continuing the heating at a temperature sufficient to maintain the reaction mass in a molten state until a copolyester is produced.

2. A process for making synthetic linear condensation copolyesters comprising forming a mixture of at least two dicarboxylic acids selected from the group consisting of saturated aliphatic dicarboxylic acids and aromatic dicarboxylic acids which when having side chains thereon, all of said side chains are saturated, and a monomeric alkylene carbonate containing from 2 to 8 carbon atoms in the alkylene group, in a molar ratio of 1 to 4 moles of acids:1 to 6 moles of the alkylene carbonate, heating and reacting said mixture at a temperature in the range of 80° to 300° C. until solution of the mixture occurs, and thereafter continuing the heating at a temperature sufficient to maintain the reaction mass in a molten state until a copolyester is produced.

3. A process for making synthetic linear condensation copolyesters comprising forming a mixture of at least two aromatic dicarboxylic acids which when having side chains thereon, all of said side chains are saturated, and a monomeric alkylene carbonate containing from 2 to 8 carbon atoms in the alkylene group in a molar ratio of 1 to 4 moles of acids:1 to 6 moles of alkylene carbonate, heating and reacting said mixture at a temperature in the range of 80° to 300° C. until solution of the mixture occurs, and thereafter continuing the heating at a temperature sufficient to maintain the reaction mass in a molten state until a copolyester is produced.

4. A process for making synthetic linear condensation copolyesters comprising forming a mixture of at least two saturated aliphatic dicarboxylic acids and a monomeric alkylene carbonate containing from 2 to 8 carbon atoms in the alkylene group in a molar ratio of 1 to 4 moles of acids:1 to 6 moles of alkylene carbonate, heating and reacting said mixture at a temperature of the range of 80° to 300° C. until solution of the mixture occurs, and thereafter continuing the heating at a temperature sufficient to maintain the reaction mass in a molten state until a copolyester is produced.

5. A process for making synthetic linear condensation copolyesters comprising forming a mixture of at least one saturated aliphatic dicarboxylic acid, at least one aromatic dicarboxylic acid which when having side chains thereon, all of said side chains are saturated, and a monomeric alkylene carbonate containing from 2 to 8 carbon atoms in the alkylene group in a molar ratio of 1 to 4 moles of the acids:1 to 6 moles of alkylene carbonate, heating and reacting said mixture at a temperature in the range of 80° to 300° C. until solution of the mixture occurs, and thereafter continuing the heating at a temperature sufficient to maintain the reaction mass in a molten state until a copolyester is produced.

6. A process for making synthetic linear condensation copolyesters comprising forming a mixture consisting of 70% by weight of an aromatic dicarboxylic acid which when having side chains thereon, all of said side chains are saturated, 30% by weight of a saturated aliphatic dicarboxylic acid, said percentages being based on the total weight of the acids, and a monomeric alkylene carbonate containing from 2 to 8 carbon atoms in the alkylene group in a molar ratio of 1 to 4 moles of acids:1 to 6 moles of alkylene carbonate, heating and reacting said mixture at a temperature in the range of 80° to 300° C. until solution of the mixture occurs and thereafter continuing the heating at a temperature sufficient to maintain the reaction mass in a molten state until filaments produced from the mass possess the property of cold-drawing.

7. A process for making synthetic linear condensation copolyesters comprising forming a mixture of at least two saturated aliphatic dicarboxylic acids, glycol, and a monomeric alkylene carbonate containing from 2 to 8 carbon atoms in the alkylene group, said components being present in the mixture in a molar ratio of 1 to 4 moles of acids:up to 5.9 moles of glycol:0.1 to 6 moles of alkylene carbonate, heating and reacting said mixture at a temperature in the range of 80° to 300° C. until solution of the mixture occurs, and thereafter continuing the heating at a temperature sufficient to maintain the reaction mass in a molten state until a copolyester is produced.

8. The process defined in claim 1 wherein the alkylene carbonate is ethylene carbonate.

9. The process defined in claim 1 wherein the alkylene carbonate is propylene carbonate.

10. The process defined in claim 1 wherein the alkylene carbonate is butylene carbonate.

11. The process defined in claim 2 wherein the alkylene carbonate is ethylene carbonate.

12. The process defined in claim 2 wherein the alkylene carbonate is propylene carbonate.

13. The process defined in claim 2 wherein the alkylene carbonate is butylene carbonate.

14. The process defined in claim 3 wherein the aromatic dicarboxylic acids in the mixture are terephthalic acid and isophthalic acid.

15. The process defined in claim claim 3 wherein the alkylene carbonate is ethylene carbonate.

16. The process defined in claim 4 wherein the alkylene carbonate is ethylene carbonate.

17. The process defined in claim 4 wherein the aliphatic dicarboxylic acids in the mixture are adipic acid and sebacic acid.

18. The process defined in claim 5 wherein the alkylene carbonate is ethylene carbonate.

units and at the same temperature, and C is the concentration in grams of the copolyester per 100 cc. of solution.

When the copolyesters have the desired properties, as pointed out hereinbefore, and are of sufficiently high molecular weight, they can be spun into filaments and the choice of the method of spinning depends in part on the properties of the polymers. Where the copolyesters are soluble in organic solvents and solutions thereof can readily be produced, dry spinning methods may be employed with solutions of the copolyesters in volatile solvents and wet spinning methods with solutions of the copolyesters in volatile or comparatively non-volatile solvents. The copolyesters may also be spun into filaments by melt spinning methods, that is, by extruding a melt of the copolyester through suitable orifices or a spinneret. In general, in the case of melt spinning, the temperature of the copolyester to be extruded should be approximately 10° to 30° above the melting point of the copolyester. If desired, the melting temperature may be modified by mixing the copolyester or polymer with various and suitable proportions of plasticizers which, in turn, may either be left in the products produced or may be partially or completely removed therefrom.

Filaments formed by the methods outlined above may be drawn out at low temperatures or at atmospheric temperature, to form very fine filaments having high tenacity and good elasticity. These drawn filaments may then be used for any of the purposes which synthetic fibers and filaments have in the past been applied. For example, the cold drawn filaments are useful in the preparation of woven fabrics or as bristles in the manufacture of brushes.

The copolyesters produced by the present process may be formed into smooth sheets and films by casting the polymer solutions on smooth surfaces, or by calendering the polymer between rollers, heating if necessary to soften the polymer. Further, the copolyesters may be employed as softening agents, in coating compositions, or they may be mixed with other compatible fiber-forming, film-forming, or lacquer substances. Generally, any of the crystalline or non-crystalline types of copolyesters produced by the present process may be fabricated to form articles of irregular shape by molding under the influence of heat and pressure.

The present invention is further illustrated by the following specific examples which are merely intended to be illustrative and not limitative. In the examples all parts and percents are by weight, unless otherwise indicated.

*Example I*

A copolyester of polyethylene terephthalate-isophthalate was prepared by the reaction of 6.5 grams of ethylene carbonate, 3.72 grams of terephthalic acid and 2.5 grams of isophthalic acid. The mixture was heated to 222° C. for ½ hour to effect solution during which time $CO_2$ was evolved. Thereafter the solution was heated at 290° C. for two hours with nitrogen introduction. During this period ethylene glycol was given off which was continuously removed by distillation. A viscous, amber solution resulted, which possssed a viscosity of 280 poises at 285° C. On cooling the solution a hard amorphous copolyester was obtained which had a sticking point of 114° C. "Sticking point," as used herein, is the minimum temperature, as determined on a Fisher-Johns melting point block, at which the copolyester exhibits detectable adhesion to the block.

*Example II*

A mixture of 1.32 grams of ethylene carbonate, 0.83 gram of terephthalic acid and 1.01 grams of sebacic acid was heated at 222° C. in the presence of 0.02 percent zinc acetate, based on the weight of the mixture, for a period of three hours with nitrogen introduction. The copolyester so obtained possessed a melting point of 60° C.

*Example III*

A mixture of 1.32 grams of ethylene carbonate, 1.25 grams of terephthalic acid, and 0.51 gram sebacic acid was heated at 222° C. for one hour. Solidification occurred and thereafter the temperature was raised to 290° C. and the mass remelted. Maintaining the temperature at 290° C. with nitrogen introduction and adding 0.02% zinc acetate, based on the weight of the mixture, led to polymerization and the production of a high molecular weight material. The white crystalline polymer so obtained becomes rubbery at 175° C. and melts at 185°–187° C.

*Example IV*

A mixture of 3.0 grams of adipic acid, 4.0 grams of sebacic acid, 10.6 grams of ethylene carbonate and 15 milligrams of zinc acetate catalyst were heated in a reaction vessel at 222° C. for a period of five hours with a stream of dry nitrogen passing through the solution. An essentially quantitative yield of a clear, colorless polymer was obtained which was in the form of a viscous liquid at room temperature. When the liquid was cooled to a temperature of −15° C. it solidified to a transparent solid.

*Example V*

A mixture of 3.0 grams of adipic acid, 4.0 grams of sebacic acid, 5.3 grams of ethylene carbonate, 3.7 grams of ethylene glycol and 15 milligrams of zinc acetate catalyst were heated for five hours at 222° C. in a reaction vessel with a stream of dry nitrogen passing through the melt. An essentially quantitative yield of a clear, viscous liquid polymer was obtained which solidified to a transparent solid on cooling to −15° to −20° C.

The present process has many advantages over processes employed heretofore. For example, when employing known processes or methods, particularly those in which polyester or copolyester formation takes place in two stages or steps, glycol is liberated in the second stage which must be removed. This in turn necessitates maintaining the reaction mixture or molten mass at elevated temperatures for prolonged periods of time. This prolonged heating tends to discolor the resultant copolyester which is obviously undesirable from a commercial standpoint. However, when employing an alkylene carbonate in place of the glycol, proportionately smaller quantities may be used and still achieve the same beneficial properties in the resultant polyester which results in a smaller amount of glycol formed. This in turn necessitates the removal of less glycol which shortens the period of heating thus alleviating the danger of discoloration of the product.

During the first stage of the reaction, wherein the hydroxyalkyl esters of the dibasic acids are formed, no inert solvent medium is employed. Therefore, mixing of the solid dibasic acids with glycol has presented a problem heretofore. When employing an alkylene carbonate, in accordance with the process of the present invention, carbon dioxide is evolved which, when bubbling through the reaction mixture, stirs the same. This provides more intimate contact between the components of the reaction mass or mixture which results in speedier reaction. In many instances, the time of reaction during the stage is cut in half when employing an alkylene carbonate rather than a glycol. Further, the water formed when a glycol is employed is much more difficult to remove from the system than the carbon dioxide which is formed when an alkylene carbonate is employed as defined in the instant invention. These are additional physical advantages of the present process.

Filaments, produced from the copolyesters prepared in accordance with the present invention which have a molecular weight of 12,000 or more, can be cold-drawn to as much as several times their original lengths. These cold-drawing operations may be carried out on filaments which have been allowed to cool fully and solidify, or 19. The process defined in claim 5 wherein the mixture contains sebacic acid and terephthalic acid.

20. The process defined in claim 7 wherein the mixture comprises adipic acid, sebacic acid, ethylene glycol and ethylene carbonate.

References Cited in the file of this patent

UNITED STATES PATENTS 2,799,667  Drewitt _____ July 16, 1957

FOREIGN PATENTS 1,005,514  France _____ Apr. 11, 1952
673,066  Great Britain _____ June 4, 1952

OTHER REFERENCES

Edgar et al.: Jour. Polymer Sci., VIII, pages 1–22, 1952.